July 28, 1964  R. P. PAULEY ETAL  3,142,396
METHOD OF FILLING AND LOADING CONTAINERS
Filed May 7, 1962
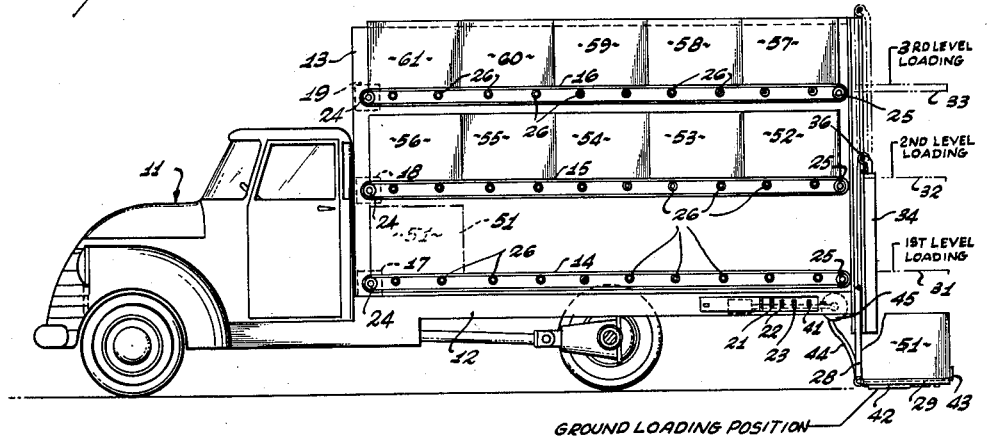
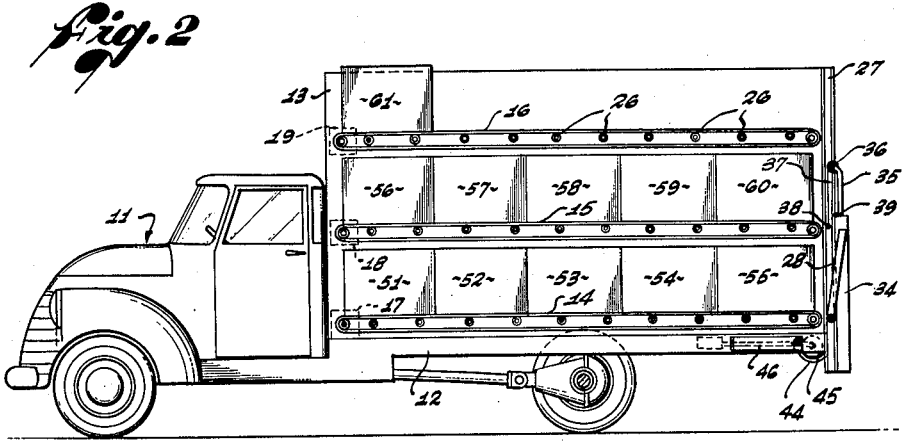
INVENTORS
ROBERT P. PAULEY
OTIS T. RALPH
BY
ATTORNEYS United States Patent Office 3,142,396
Patented July 28, 1964

3,142,396
METHOD OF FILLING AND LOADING
CONTAINERS
Robert P. Pauley and Otis T. Ralph, both of
P.O. Box 845, Phoenix, Ariz.
Filed May 7, 1962, Ser. No. 192,861
8 Claims. (Cl. 214—152)

The present invention relates to a new and improved method of filling and loading containers and more particularly to the bulk filling and loading of a plurality of containers onto a plurality of levels or decks in a truck, in which empty containers carried in the truck may be so filled and loaded without removal from the truck.

In the bulk loading of containers and boxes on trucks for transport to a processing station or storage depot, the containers are conventionally filled on the ground or on platforms while separated from the truck and then moved to and loaded on the truck while filled. As the filled containers are quite heavy, this usually requires auxiliary handling equipment and is time consuming. According to the present invention empty containers are carried to a filling station on a truck, are filled, and then finally loaded at several levels on the truck, all without removing the containers from the truck.

In carrying out the method according to the present invention, a transport truck or other carriage having a plurality of loading levels is loaded with empty containers so that all levels except one are loaded to capacity, and the one exception is loaded with only one empty container. The truck then transports the empty containers to a filling station where the single empty container on the one level is moved to filling position, is filled, and then loaded back on the same level. Then, the end container of a second level is transferred to filling position, is filled, and then loaded on the first level in back of the single container. All but the last container on the second level are similarly filled, in sequence, and then loaded on the first level.

The last container on the second level is moved to filling position, is filled, and loaded back on the second level. If there is a third loading level, the empty containers thereon are filled and loaded onto the second loading level except for the last one which is returned to the third level after being filled.

When all the containers are filled and loaded, they will be in an over-all reversed position; that is, the exception level originally having one empty box will now be completely loaded with filled containers, and one of the levels previously fully loaded with empty containers will now be loaded with a single filled container. During this sequential or rotational filling and loading of the containers, they are held on the truck at all times so that handling is facilitated and may be carried out by carrying and moving equipment mounted on the truck.

An object of the present invention is an improved method of filling empty containers and loading the filled containers on a transport truck.

Another object of this invention is an improved method of filling and loading containers carried on a transport truck without removing the containers from the truck during the filling and loading operation.

A further object of this invention is a new and improved method of filling and loading containers carried by a transport truck in which the containers are moved from empty to filling and loaded positions on the truck by carrying and moving means on the truck without being removed from the truck throughout the operation.

A still further object of this invention is a new and improved method of filling and loading containers carried on a plurality of levels on a transport truck by moving the containers in sequence into filling and loaded positions on the truck without removal from the truck, and in which the loaded containers are positioned substantially inverse to their positioning while empty.

Yet another object of this invention is a new and improved method of filling and loading containers from empty to filled, loaded positions without removal from a transport truck in which the containers are carried on a plurality of levels in the truck and, when empty, one of the levels contains but a single container which is filled and returned to the same level to initiate the loading operation.

These and other objects and features of the present invention will be apparent from the following specification and the appended drawing illustrating a transport truck in which the method of the present invention may be carried out, in which:

FIGURE 1 is a side elevational view of a transport truck with a side wall cut away, and illustrating the empty container loading of a multi-deck truck according to the method of the present invention except for the first container which is shown in full lines in filling position; and FIGURE 2 is a view similar to FIGURE 1, but showing the filled container loading of the truck.

As illustrated in FIGURES 1 and 2, an apparatus in which the method of the present invention may be carried out is mounted on a transport truck 11 having a bed 12 supporting side walls or frames 13, only one of which is shown in the figures of the drawing. It will, of course, be understood that the truck may be of tractor-trailer or other configuration, the particular form of transport forming no part of the method of the invention.

Between the side frames 13 are mounted three conveyors 14, 15 and 16 in superposed relation, and preferably of endless belt or chain type, and individually driven in opposite directions by reversible electric motors 17, 18 and 19, respectively controlled by electric switches 21, 22 and 23. Each of the conveyors 14, 15 and 16 extends over a driving roller 24 and an idler roller 25, and is supported intermediate the end rollers by a plurality of intermediate rollers 26.

At the rear end of the side frames 13 are mounted a pair of opposed angle brackets 27 within which an elevator 28 is guided for vertical movement. The elevator 28 has a hinged platform 29 movable from the container filling position of FIGURE 1 into the traveling position of FIGURE 2, and movable as an elevator to move the containers between their lowered filling position and conveyor loading levels 31, 32 and 33. The elevator is operated by a pair of hydraulic rams 34, only one of which is shown, which are located at opposite sides of the back of the truck. The rams operate piston rods 35 carrying pulleys or sprockets 36 at their upper ends. Chains or flexible belts 37 interconnect the upper edge 38 of the elevator 28 and fixed points 39. The hydraulic rams 34 are controlled by a valve 41 from a source of hydraulic power (not shown).

The platform 29 of the elevator 28 is provided with a small hydraulic ram 42 which operates a pusher 43 to move the filled containers from the platform onto the truck conveyors at one of the loading levels 31, 32, 33. The ram 42 is connected by suitable flexible tubing 44, wound on a reel 45, through a control valve (not shown) to the source of hydraulic power.

To assist in explaining the method of filling and loading the containers according to the present invention, the empty containers in FIGURE 1 have been given a numeral designation 51 through 61, and the filled contains of FIGURE 2 retain the same numerical designations so the shift in the positions of the containers will be readily apparent from an inspection of the figures. Container 51 is shown in full lines in FIGURE 1 on the platform 29 and in lowered, filling position at the back of the truck. The position it occupied while being transported to the filling station is shown in phantom.

The empty containers 51 through 61 may be loaded on the truck 11 at a processing station or other depot where the filled containers have been emptied, or at any other point. The elevator 28 will be in a position of FIGURE 2 as the truck moves the empty containers to a filling station, for example, a fruit orchard. It will be seen from FIGURE 1 that the conveyor 14 forming the bottom level or deck of the truck will, during transport, have only a single empty container in the phantom position thereon. Any of the conveyors on the truck can contain the single container so long as one of them has just one empty container thereon. Preferably this is one of the two lower conveyors so that in the filled and loaded positions, the top level will be the one containing the single loaded container so as to have a low center of mass in the loaded truck.

Assuming then that the truck is loaded with empty containers as shown in FIGURE 1, it is placed in position adjacent the material to be filled in the containers, and the platform 29 placed in a horizontal position at the first loading level 31. The motor 17 is then energized to move the conveyor 14 and move the container 51 thereon from its left-hand position shown in phantom in FIGURE 1 onto the elevator platform 29, when the motor is stopped. The ram 34 is then actuated to lower the elevator 28 into its lowered position, shown in full lines in FIGURE 1, with the container 51 in filling position.

The container 51 is then filled, as for example with bulk fruit, and the ram 34 actuated to raise the elevator 28 and bring the platform 29 again to the first loading level 31. The ram 42 is then actuated and the pusher 43 removes the filled container 51 from the platform 29 onto the conveyor 14. The motor 17 is energized in reverse direction, and the filled container 51 moves to the left, as viewed in FIGURE 1, a sufficient distance to clear conveyor space for the next container, when the motor is stopped. If desired, the filled container 51 can be moved all the way to its final loaded position of FIGURE 2 at this time.

Either container 52 or 57 is now placed on the loading platform 29 by raising the elevator 28 to the proper level 32, 33 and energizing the proper conveyor motor 18, 19, and the elevator lowered into its FIGURE 1 filling position. The container thereon, now assumed to be 52, is filled and then moved upwardly to the first loading level 31, whereupon the ram 42 is actuated to move the box 52 onto the conveyor 14. The motor 17 then is actuated to move the filled containers 51 and 52 to the left to uncover conveyor space for the next container, or to move container 52 into its final loaded position of FIGURE 2, in conformance with the position selected for filled container 51. When the containers are moved into their final loaded positions immediately after leaving the platform 29, the container 51 engages stops to locate its final position and the conveyor 14 will thereafter slide under it and the other containers in final loaded position. Containers 53, 54 and 55 follow the same procedure as container 52 to fill conveyor 14 and the first loading level, as shown in FIGURE 2.

Container 56 is now moved onto the platform 29 and elevator 28 is lowered to the filling position. After container 56 is filled, the elevator returns to the second loading level and container 56 is returned to the middle conveyor 15 and goes through the same movements as container 51 to arrive at the same position which it occupied when empty. Containers 57, 58, 59 and 60 are now successively lowered, filled and loaded on the middle conveyor 15 in the same manner that containers 52, 53, 54 and 55 were loaded on conveyor 14. Then container 61 is lowered, filled, and returned to the same position it occupied when empty, just as were empty containers 51 and 56. The resultant filled container loading of FIGURE 2 is seen to be the inverse of that of FIGURE 1, with the center of mass of the loaded truck maintained low by having the lower two conveyors 14, 15 fully loaded, while the upper conveyor 16 has the single container thereon.

It will be seen that in carrying out the method of the present invention empty containers carried on a truck are filled and then loaded on the truck without being removed from the truck while being handled and moved by elements mounted thereon. The inventive method employs a multi-level loading for the truck in which, when the containers are empty, one level contains only a single empty container, with the result that when the containers are filled and loaded, one of the levels will contain a single filled container. The latter condition obviously need not be retained after it has been accomplished, as filled containers may thereafter be removed from other levels and placed on the single container level, if desired, although there is no particular reason for doing so. Also, it will be seen that any of the truck levels may contain the single empty container and the single filled container, but it is preferable to end up with the single filled container at the top so as to secure a lower center of mass for the loaded truck. When the loading is completed, the elevator 28 is preferably raised above its container-filling position, and the platform 29 pivoted upwardly into an out-of-the-way position, as shown in FIGURE 2.

A locked cover 46, FIGURE 2, preferably covers the controls for the conveyors and elevator to prevent unauthorized access thereto when the truck is loaded for transport of either empty or filled containers.

While a certain preferred method of filling and loading containers and an embodiment in which the inventive method may be carried out have been specifically illustrated and described, it will be understood that the invention is not limited thereto as many variations will be apparent to those skilled in the art, and the invention is to be given its broadest interpretation within the terms of the following claims.

We claim:

1. The method of filling and loading containers which comprises: loading a plurality of empty containers on a plurality of levels, one of which contains a single empty container; moving said single empty container to a filling position; filling said single empty container; returning said filled single container to its original level for loading thereon; moving the end empty container from a second level to the filling position and, when filled, loading it in back of the filled single container on said one level; successively moving all but the last container on said second level to the filling position and, when filled, loading them on said one level; and moving the last empty container on said second level to filling position and, when filled, returning said last second level container back to said second level for loading thereon.

2. The method of filling and loading containers which comprises: loading a plurality of empty containers on a plurality of levels in a transport device with one of the levels other than the top level containing a single empty container; moving said transport device to a filling station having material for filling the containers; moving said single empty container to a filling position; filling said single empty container; returning said filled single container to its original level for loading thereon; moving the end empty container from another level to the filling position and, when filled, loading it in back of said filled single container at the first level; successively moving all but the last container on said other level to the filling position and, when filled, to the first level for loading; and moving the last empty container on said other level to filling position and, when filled, returning said last other level container back to said other level for loading thereon.

3. The method of filling and loading containers which comprises: loading a plurality of empty containers on a plurality of levels in a transport device with one of the levels other than the top level containing a single empty container; moving said transport device to a filling station having material for filling the containers; moving said single empty container to a filling position; filling said single empty container; returning said filled single container to its original level for loading thereon; moving the end empty container from another level to the filling position and, when filled, loading it in back of said filled single container at the first level; successively moving all but the last container on said other level to the filling position and, when filled, to the first level for loading thereon; moving the last empty container on said other level to filling position and, when filled, returning said last other level container back to said other level for loading thereon; and moving the empty containers on a third level to filling position and, when filled, to said other level or to their original level in the same manner as said other level containers were successively filled and loaded, whereby to finish with fully loaded lower levels and a top level containing a single filled container.

4. The method of filling and loading containers which comprises: loading a plurality of empty containers on a plurality of levels in a transport device with one of the levels other than the top level containing a single empty container; moving said transport device to a filling station having material for filling the containers; moving said single empty container to a filling position; filling said single empty container; returning said filled single container to its original level for loading thereon; moving the end empty container from another level to the filling position and, when filled, loading it in back of said filled single container at the first level; successively moving all but the last container on said other level to the filling position and, when filled, to the first level for loading; moving the last empty container on said other level to filling position and, when filled, returning said last other level container back to said other level for loading thereon; and supporting said containers on said transport device throughout the entire operation of moving, filling and loading the containers.

5. The method of filling and loading containers which comprises: loading a plurality of empty containers on a plurality of levels on a transport truck with one of the levels containing a single empty container; moving the truck and the containers thereon to a filling station and positioning the truck thereat; moving said single empty container to the rear end of the truck; lowering said single empty container to substantially ground level for filling; returning the filled single container to its original level and loading it thereon; moving the end empty container from another level to the rear of the truck; lowering the end empty container to substantially ground level for filling and elevating the filled end container to the level of said single container and loading it in back of the single container; successively moving all but the last container on said other level to the rear of the truck, lowering them substantially to ground level for filling and elevating the filled containers to the level of the single container and loading them thereon; and moving the last empty container on said other level to the rear of the truck, lowering it substantially to ground level for filling and elevating the filled last other level container back to its original level and loading it thereon.

6. The method of filling and loading containers which comprises: loading a plurality of empty containers on a plurality of levels on a transport truck with one of the levels containing a single empty container; moving the truck and the containers thereon to a filling station and positioning the truck thereat; moving said single empty container to the rear end of the truck; lowering said single empty container to substantially ground level for filling; returning said filled single container to its original level and loading it thereon; moving the end empty container from another level to the rear of the truck; lowering the end empty container to substantially ground level for filling and elevating the filled end container to the level of said single container and loading it in back of the single container; successively moving all but the last container on said other level to the rear of the truck, lowering them substantially to ground level for filling and elevating the filled containers to the level of the single container and loading them thereon; moving the last empty container on said other level to the rear of the truck, lowering it substantially to ground level for filling and elevating the filled last other level container back to its original level and loading it thereon; successively moving the empty containers on the remaining levels on the truck to the rear thereof, lowering them to substantially ground level for filling, and returning them to said other level or their own level, as the case may be, to conform to the operation carried out on the empty containers on said other level so as to arrive at a fully loaded condition where all the levels except one are fully loaded with filled containers and the one exception is loaded with the single filled container.

7. The method of filling and loading containers which comprises: loading a plurality of empty containers on a plurality of levels on a transport truck with one of the levels containing a single empty container; moving the truck and the containers thereon to a filling station and positioning the truck thereat; moving said single empty container to the rear end of the truck; lowering said single empty container to substantially ground level for filling; returning the filled single container to its original level and loading it thereon; moving the end empty container from another level to the rear of the truck; lowering the end empty container to substantially ground level for filling and elevating the filled end container to the level of said single container and loading it in back of the single container; successively moving all but the last container on said other level to the rear of the truck, lowering them substantially to ground level for filling and elevating the filled containers to the level of the single container and loading them thereon; moving the last empty container on said other level to the rear of the truck, lowering it substantially to ground level for filling and elevating the filled last other level container back to its original level and loading it thereon; and supporting said containers upon the transport device throughout the entire operation of moving, filling and loading the containers.

8. The method of filling and loading containers which comprises: loading a plurality of empty containers on a plurality of levels in a transport device with one of the levels other than the top level containing a single empty container; moving said transport device to a filling station having material for filling the containers; moving said single empty container to a filling position; filling said single empty container; returning said filled single container to its original level for loading thereon; moving the end empty container from another level to the filling position and, when filled, loading it in back of said filled single container at the first level; successively moving all but the last container on said other level to the filling position and, when filled, to the first level for loading thereon; moving the last empty container on said other level to filling position and, when filled, returning said last other level container back to said other level for loading thereon; moving the empty containers on a third level to filling position and, when filled, to said other level or to their original level in the same manner as said other level containers were successively filled and loaded, whereby to finish with fully loaded lower levels and a top level containing a single filled container; and supporting said containers upon the transport device throughout the entire operation of moving, filling and loading the containers.

References Cited in the file of this patent
UNITED STATES PATENTS

| | | |
|---|---|---|
| 1,206,169 | Talbot | Nov. 28, 1916 |
| 2,837,224 | Rosen | June 3, 1958 |

FOREIGN PATENTS

| | | |
|---|---|---|
| 732,638 | Great Britain | June 29, 1955 |